United States Patent [19]

Hull, deceased et al.

[11] 4,168,759
[45] Sep. 25, 1979

[54] AUTOMOBILE WITH WIND DRIVEN GENERATOR

[76] Inventors: R. Dell Hull, deceased, late of Catoosa, Okla.; by Lula B. Hull, executrix, Rte. #1, Box 310, Catoosa, Okla. 74015

[21] Appl. No.: 839,799

[22] Filed: Oct. 6, 1977

[51] Int. Cl.² ............................................. B60K 1/00
[52] U.S. Cl. ............................................. 180/65 DD
[58] Field of Search ............ 180/65 R, 65 D, 65 DD; 290/55; 415/122 R; 416/246

[56] References Cited

U.S. PATENT DOCUMENTS

| | | | |
|---|---|---|---|
| 2,152,984 | 4/1939 | Wilford | 416/246 X |
| 3,228,475 | 1/1966 | Worthmann | 180/65 DD |
| 3,374,849 | 3/1968 | Redman | 180/65 DD |
| 3,513,326 | 5/1970 | Potts | 180/65 DD |
| 4,012,163 | 3/1977 | Badmgartner | 180/65 DD X |
| 4,019,828 | 4/1977 | Bunzer | 180/65 DD X |

Primary Examiner—Richard A. Bertsch
Assistant Examiner—Gene A. Church
Attorney, Agent, or Firm—Mandeville and Schweitzer

[57] ABSTRACT

An automobile including a body provided with a passenger compartment and a uniquely shaped front end section whereby the forward motion of the automobile will result in a highly effective channeling of oncoming air to the roof of the passenger compartment. An opening is provided at the forefront of the roof contiguous with the downstream end of the front air scoop, and communicating with a chamber arranged above the passenger compartment of the automobile. The chamber includes a rear exit vent. Within the chamber there is an angularly oriented impeller positioned in the direct path of the air forced through the chamber by the front air scoop whereby the impeller is driven by the forced air. The impeller is connected by a suitable mechanical coupling to a generator to provide auxiliary power for the automobile.

2 Claims, 3 Drawing Figures

AUTOMOBILE WITH WIND DRIVEN GENERATOR

BACKGROUND AND SUMMARY OF THE INVENTION

The present invention is related to an automobile with a wind driven generator. There is today a growing need for an automobile designed to operate with a minimal consumption of energy and a nominal impact on the environment. The exigencies created by the shortage of energy supplies and the growing air pollution problem demand a vehicle that can effectively utilize the mechanical energy of the air flow generated by the forward movement of the vehicle. Therefore, it is a primary objective of the present invention to provide an automobile with a unique front end design capable of serving as an air scoop to effectively channel the oncoming air to a wind driven generator means. More particularly, there is provided a wind driven impeller advantageously mounted in a chamber above the passenger compartment of the automobile. The chamber includes an intake vent at its forward most end and an exit vent, whereby air may be forced therethrough to impart motion to the impeller. The impeller is mechanically coupled to an electrical generator to produce auxiliary power for use in the operation of the automobile.

In accordance with an important feature of the invention, the intake of the chamber is located above the passenger compartment. The front portion of the automobile body is of a generally concave, scoop-like shape. From the foremost end of the automobile body to approximately the mid region of the hood section, the upper surface of the automobile body is of a convex contour. At the mid region, the upper surface follows a concave contour which extends up past the windshield to the intake vent of the air chamber. A longitudinally extending channel or groove is formed along the hood section from the front end of the automobile body to the intake vent. The width of the channel is substantially the same as the width of the hood section.

To advantage, the wide channel at the front of the automobile permits a very effective channeling of oncoming air to the intake vent of the air chamber. The specific configuration and dimensions of the channel utilizes substantially the entire air contacting front of the automobile body as an air scoop. Thus, as the automobile is propelled forwardly, a good portion of the air that would normally offer resistance to the forward movement of the automobile will flow along the sinuous channel through the air chamber and out the rear exit vent. The end section of the automobile body may be shaped in a "fast back" configuration to facilitate the flow of the air through the chamber. Moreover, the overall shape of the automobile may be aerodynamically designed to improve the flow of the body through the atmosphere.

Within the air chamber, an impeller is oriented in the direct path of the air flowing through the chamber. The highly effective channeling of oncoming air is therefore utilized to impart rotation to the impeller. The uniquely designed front end of the automobile body harnesses the energy of the oncoming air to drive the impeller rather than offer resistance to the forward movement of the automobile. The mechanical motion of the impeller is transferred by a suitable mechanical coupling to an electric generator. The power thus generated is used to aid the forward propulsion of the automobile and/or to drive various accessories such as lights, windshield wipers, etc.

The configuration of the automobile body therefore provides a highly advantageous means for reducing air resistance and at the same time utilizes the energy of the oncoming air to aid in the driving of the automobile. This will reduce the fuel requirements for the automobile in a twofold way. Moreover, the automobile of the present invention will aid in the effort to conserve energy and help alleviate air pollution problems by the use of electrical energy for propulsion.

For a better understanding of the above and other features and advantages of the invention, reference should be made to the following detailed description of a preferred embodiment and to the accompanying drawings.

DETAILED DESCRIPTION OF A PREFERRED EMBODIMENT

Figure 1:
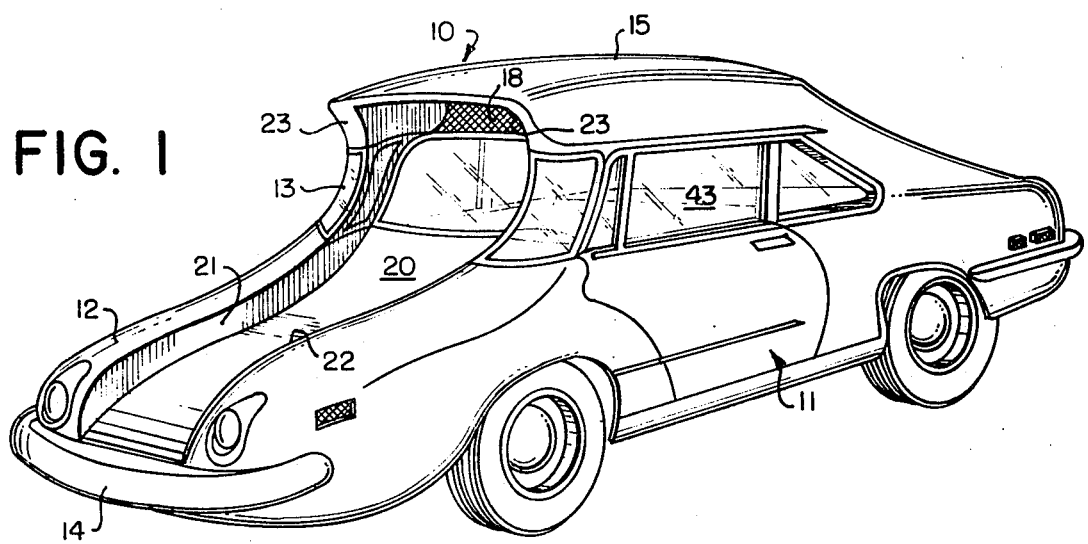
FIG. 1 is a perspective view of an automobile built in accordance with the present invention.

Referring now to the drawings and initially to FIG. 1 thereof, there is shown an automobile designated generally by the reference numeral 10. The automobile 10 includes a body 11, means for forward propulsion (discussed hereinbelow) and wheels and tires arranged and mounted in a well-known manner. Of particular importance is the design of the front portion of the automobile body 11. The hood 12 and windshield 13 areas are of a generally concave shape. In the area of the front bumper 14, the contour of the hood 12 is somewhat convex from the bumper 14 to approximately the mid-region of the hood 12. Thereafter, the contour assumes the form of a concave surface as the hood 12 extends to the windshield 13 of the automobile body 11. The surface of the windshield 13 is contiguous with the hood 12 and continues the concave surface to the top of the automobile body 11.

Figure 2:
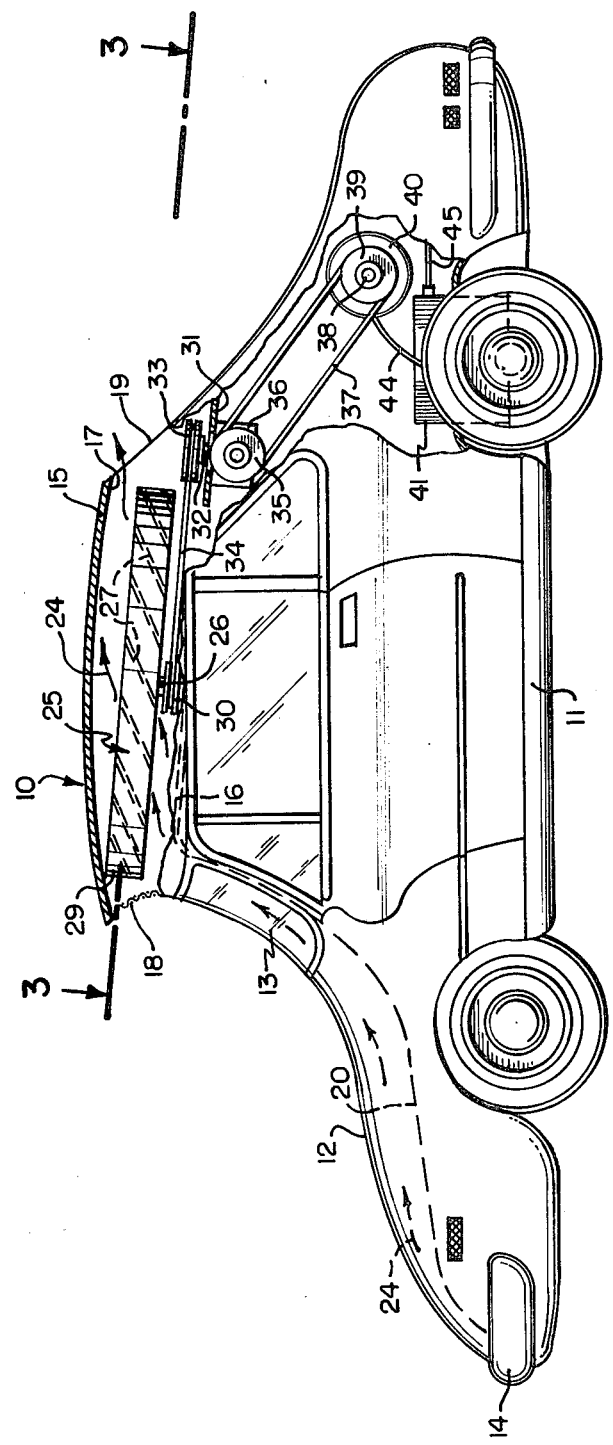
FIG. 2 is a side view in partial cross-section of the automobile in FIG. 1.

As shown in FIG. 2, a spacing is provided between the roof 16 of the passenger compartment 43 of the automobile body 11 and the top wall 15 thereof, to form an air flow passage 17. The forefront of the air passage 17 includes a grill 18 which, for asthetic purposes, may form part of the generally concave surface of the automobile front. The rear of the air passage 17 also includes an opening 19 to permit air flow therethrough.

In accordance with the invention, the generally concave surface formed by the hood 12 and windshield 13 is designed to include a wide, longitudinally extending channel 20. The channel 20 extends widthwise between two vertical walls 21, 22. As can be clearly seen in FIG. 1, the channel 20 transforms the front end of the automobile body 11 into a large air scoop. The forward movement of the automobile 10 will cause the oncoming air to be confined within the channel 20 and urged up towards the grill 18. This will channel a large portion of the oncoming air to the forefront of the air flow passage 17.

Figure 3:
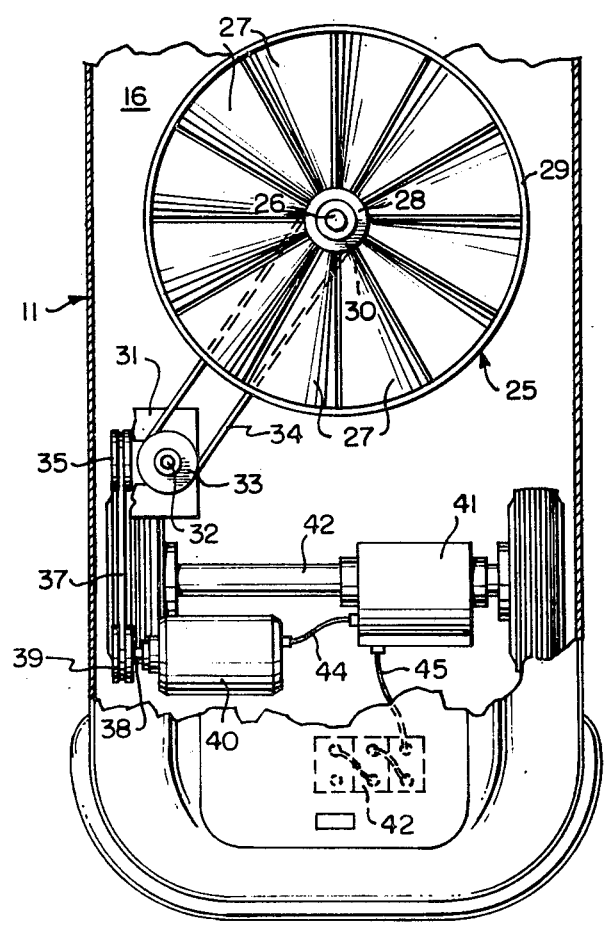
FIG. 3 is a partial cross-sectional view of the automobile taken generally along line 3—3 of FIG. 2.

Referring now more particularly to FIGS. 2 and 3, an impeller 25 is fixedly mounted on a shaft 26 within the air passage 17. The shaft 26 is rotatably journaled on an appropriate support (not shown) fixed on the roof 16 of the passenger compartment 43 and projects upwardly at a slight angle to the roof 16 so that the mounted impeller 25 tilts downward toward the rear end of the automobile 10. The angle of the shaft 26 is sufficient enough to tilt the impeller 25 such that the end of the impeller 25 adjacent the forefront of the air passage 17 is in close proximity to the top wall 15 of the automobile 10. The impeller 25 is of a large diameter whereby the impeller 25 occupies a substantial area within the direct forced air path of the passage 17. The impeller 25 includes a plurality of blades 27 extending between a central hub 28 mounted on the shaft 26 and an outer cylindrical wall 29. The blades 27 are spaced circumferentially about the hub 28 and are angularly oriented, as clearly shown in FIG. 2. Moreover, the front of the air passage 17 may be formed as a cowling to direct all of the air forced through the air passage 17 up to the impeller 25.

In this manner, the air forced up into the air passage 17 by the action of the channel 20 will flow under the raised front end of the impeller 25. Due to the angular orientation of the impeller 25, whereby the front end thereof is in close proximity to the top wall 15, the air must flow through the blades 27 of the impeller 25 to pass through the air passage 17 and out the rear vent 19. The action of the forced air on the blades 27 will impart rotation to the impeller 25. The mechanical energy of the rotating impeller 25 is utilized as auxiliary power for use in the automobile, as will be discussed hereinbelow.

Fixedly attached to the shaft 26 is a pulley 30. Adjacent the rear end of the fan 25 is a plate 31 which supports a rotatable shaft 32. A second pulley 33 is fixedly mounted on the shaft 32, and an endless drive belt 34 extends between the first and second pulleys 30, 33. The shaft 32 is mechanically connected through a gear box 36 to a third pulley 35. An endless drive belt 37 extends between the pulley 35 and a pulley 39 fixedly mounted on the shaft 38 of an electrical generator 40. Therefore, the rotating impeller 25 will drive the generator 40 through the endless belts 34, 37.

In the illustrated embodiment of the invention, the output of the generator 40 is electrically connected by a cable 44 to a motor 41 mounted in driving engagement with the rear axle 42 of the automobile 10. The output of the generator 40, however, is in no way limited to this application and may be used to drive any of the electrical accessories of the automobile 10. Thus, the motor 41 is also connected by a cable 45 to a bank of batteries 42 as a primary source of electrical power.

The present invention therefore provides a highly advantageous automotive design coupled with a unique wind driven generator to take full advantage of the potential wind power created by the forward movement of the automobile. The large scoop-like channel forming substantially the entire front portion of the automobile is highly effective in channeling the air into the air flow passage. Moreover, the angled impeller positioned in the direct path of the air forced through the chamber efficiently transforms the mechanical energy of the air to a driving force for an electrical generator. Thus, the overall design for the automobile of the present invention greatly reduces the energy requirements for forward propulsion by harnessing the potential energy of the relative motion of the vehicle in air.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A power-driven vehicle provided with a wind-driven generator, which comprises
   (a) a vehicle body having a passenger compartment and a front hood section,
   (b) said front hood section being of generally concave, scoop-like contours defining a channel extending across substantially the full width of the vehicle body and configured to utilize substantially the entire air contacting front of said body for confining and directing a flow of air upwardly during forward motion of said vehicle,
   (c) means above said passenger compartment forming an air flow passage for guiding and confining air directed thereinto by said scoop-like hood section,
   (d) a rotary impeller mounted in said passage,
   (e) said impeller being of such diameter as to extend across substantially the full width and length of the air flow passage and occupy a substantial area within the direct forced air path of said air flow passage,
   (f) said impeller being mounted about a rearwardly tilted axis, whereby said confined air flow is forced under and through the impeller across its entire width to impart a driving force thereto, and
   (g) generator means driven by said impeller.

2. A vehicle according to claim 1, further characterized by
   (a) said vehicle having a windshield forming part of said passenger compartment and continuing the scoop-like contours of said hood section, and
   (b) a wide, longitudinally extending channel formed along the entire length of the scoop-like hood section and windshield to confine and channel the oncoming air up to said air flow passage.

* * * * *